Jan. 10, 1928.  1,655,712

J. S. REYNOLDS

DISK HARROW

Filed March 30, 1925

INVENTOR:
JOSEPH S. REYNOLDS,

ATTORNEY.

Patented Jan. 10, 1928.

1,655,712

UNITED STATES PATENT OFFICE.

JOSEPH S. REYNOLDS, OF LOS ANGELES, CALIFORNIA, ASSIGNOR TO HEBER F. TOWNER, OF SANTA ANA, CALIFORNIA.

DISK HARROW.

Application filed March 30, 1925. Serial No. 19,362.

This invention relates to agricultural implements, and it closely relates to disk harrows. Disk harrows are used for the purpose of preparing soil for agricultural purposes. The customary disk harrow comprises gang constructions which have gangs of disks. When the harrow is drawn over the ground, these disks perform a mincing operation thereon which is highly desirable as a preparation previous to planting. The gangs are preferably arranged at slight angles with the direction in which they are moved so that a sort of tilling action on the soil is obtained.

It is an object of my invention to provide a novel design of disk harrow. In one form of my invention I provide a leading gang and a following gang construction, each of which has a gang of disks. The leading and following gang constructions are pivoted together at one end thereof, preferably at or to the outside of the end disks of the gangs.

It is another object of my invention to provide an arrangement for adjusting the angular relationship of these gangs in order that the tilling action of the harrow may be varied.

It is a still further object of my invention to provide an adjustment means whereby the leading and following gangs may be simultaneously adjusted in such a manner that they will always be in balance. I attach a flexible line to the pivoted end of the leading gang and attach this line to a draft member. A flexible member is attached to the free end of the following gang and extended to the draft member and then to the free end of the leading gang. By repositioning the engagement between the draft member and the flexible member, a simultaneous re-positioning of the leading and following gangs is acquired.

Another object of my invention is to provide an adjustment means of the character mentioned which also permits an individual adjustment of either of the gang constructions. This object of my invention I accomplish by adjustably attaching the flexible line to the leading gang and to the draft member and by adjustably attaching the flexible member to the leading gang and to the following gang as well as to the draft member.

A further object of my invention comprises a novel grab link which is of extremely simplified construction.

Other objects and the specific advantages of this invention will be brought out in the following description.

Referring to the drawing which is solely for illustrative purposes and in which I show a preferred form of my invention.

Figure 1:
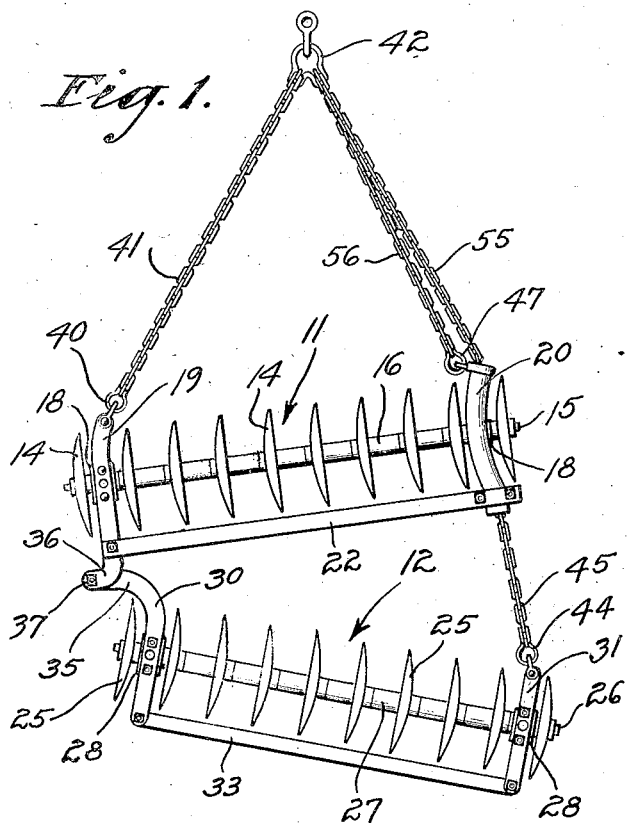
Fig. 1 is a plan view of a disk harrow embodying the essentials of my invention.

With attention to Fig. 1, I provide a disk harrow which has a leading gang 11 and a following gang 12. The leading gang 11 is composed of a multiple of disks 14 which are placed on a shaft 15 and are spaced apart by sleeves 16. The shaft 15 is supported near each end thereof by blocks 18. Secured to the left hand block 18 is a pull bar 19 and secured to the right hand block 18 is a pipe 20. A cross bar 22 extends between the rearward portions of the pull bar 19 and the pipe 20 for the purpose of bracing. The following gang 12 is composed of a multiple of disks 25 which are carried on a shaft 26 and spaced apart by sleeves 27. The shaft 26 is supported by blocks 28 which are placed near each end of the shaft 26. A pivot bar 30 is secured to the left hand block 28 and an attachment bar 31 is secured to the right hand block 28. The rearward ends of the pivot bar 30 and the attachment bar 31 are braced by a cross member 33 which secures and extends between the rearward ends thereof.

The forward portion 35 of the pivot bar 30 is curved to the left, as shown in Fig. 1, so that the end thereof extends beyond the left hand disk 25 of the rear gang 12. The rear end of the pull bar 19 is extended leftwardly at 36 to a point beyond the left hand disk 14 of the leading gang 11. Extending through the ends of the portions 35 and 36 is a pivot bolt 37 by which the leading and following gangs 11 and 12 are pivotally secured together.

A grab link 40 is attached to the forward end of the pull bar 19, this grab link 40 being arranged to grab a flexible line in the form of a chain 41. The forward end of the chain 41 is engaged by a double grab link 42 which comprises a draft member of the invention. A grab link 44 is attached to the forward end of the attachment bar 31 and engages a flexible member in the form of a chain 45. This chain 45 extends forwardly through the pipe 20 of the leading gang 11 and extends to the double grab link 42. The chain extends to the free end of the leading gang 11 and is engaged by a grab link 47 which is attached at the forward end of the pipe 20.

Figure 2:
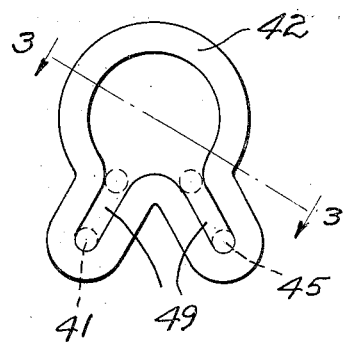
Fig. 2 is an enlarged view of a grab link of my invention.
Figure 3:
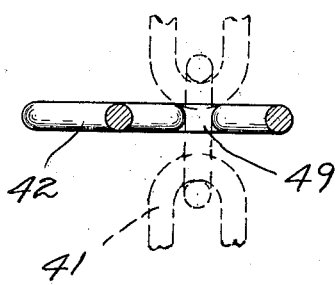
Fig. 3 is a section taken on the line 3—3 of Fig. 2.

As clearly shown in Figs. 2 and 3, the grab link 42 of my invention is composed of a bar which is so formed as to provide a pair of link receiving channels 49. One of these channels 49 is adapted to engage a link of the chain 41 and the other of the channels 49 is arranged to engage a link of the chain 45. By providing double link receiving channels, it is only necessary to provide one member whereas it was previously necessary to provide a pair of grab links.

Figure 4:
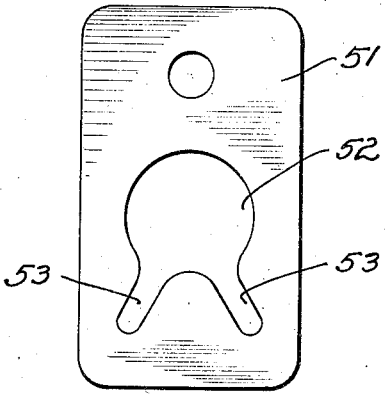
Fig. 4 is a face view showing an alternative grab construction of my invention.

In Fig. 4 I show another form of grab link. This form is made from a plate 51 which has an aperture 52 formed therein. The aperture 52 has link receiving channels 53 into each of which a link of a chain may be placed.

The angular positions of the leading and following gangs 11 and 12 are simultaneously adjusted by placing a different link of the chain 45 in one of the link receiving channels 49 of the double grab link 42. This re-positioning will either lengthen the portion 55 of the chain 45 which extends to the following gang 12 and shorten the portion 56 which extends to the leading gang 11 or lengthen the portion 56 and shorten the portion 55. From this, it is evident that the gangs may be simultaneously moved into neutral position or moved into any desired working position. The leading and following gangs 11 and 12 may be independently adjusted by reason of the provision of the grab links at each point of attachment of either of the chains 41 or 45 to the gangs 11 and 12 or the draft member 42. It is thought desirable to place the pivots 37 at or beyond the ends of the gangs 11 and 12 so that a powerful leverage for retaining the gangs in a set position may be had.

The device as described and illustrated is of a sturdy nature and a simple construction. The novel adjustment arrangement is an expedient to the easy operation of the harrow. The means for simultaneously adjusting the leading and following gangs is a very important factor of my invention due to the fact that it eliminates considerable trouble in balancing the gangs.

I claim as my invention:

1. In a disk harrow, the combination of: a leading gang; a following gang; means for pivoting said gangs together near a pair of adjacent ends, said means being situated equidistant from the shafts of the leading and following gangs, said shafts carrying disks thereon; a draft member; a member adjustable in length for connecting the pivoted end of said leading gang to said draft member; and a flexible member for connecting the free ends of said leading and following gangs to said draft member.

2. In a disk harrow, the combination of: a leading gang; a following gang; means for pivoting an end portion of said leading gang to an adjacent end portion of said following gang; a grab link disposed in front of said harrow; a primary flexible member secured to the pivoted end of said leading gang and adapted to be gripped by said grab link at different points; and a secondary flexible member, one end of which is secured to the free end of said leading gang and the other end of which is secured to the free end of said following gang and the intermediate portion of which is adapted to engage with said grab link at different points on said secondary member.

3. In a disk harrow, the combination of: a leading gang; a following gang; means for pivoting an end portion of said leading gang to an adjacent end portion of said following gang; a grab link disposed in front of said harrow; a primary member secured at its opposite ends to the pivoted end of said leading gang and to said grab link; and a flexible secondary member, one end of which is secured to the free end of said leading gang and the other end of which is secured to the free end of said following gang and the intermediate portion of which is adapted to engage with said grab link at different points on said secondary member.

4. In a position adjusting draft device for agricultural implements the combination of: a draft member; a leading gang and a following gang following said draft member and pivoted together at a pair of adjacent ends; a primary connecting member connecting the pivoted end of said leading gang and said draft member; means for adjusting the effective length of said primary connecting member; a secondary connecting member engaged by said draft member and having one end thereof extending to a free end of said leading gang and the other end thereof extending to the free end of said following gang; and means for changing the point in said secondary connecting member at which it is engaged by said draft member.

In testimony whereof, I have hereunto set my hand at Los Angeles, California, this 23d day of March, 1925.

JOSEPH S. REYNOLDS.